US006045705A

United States Patent [19]

Watson et al.

[11] Patent Number: 6,045,705

[45] Date of Patent: Apr. 4, 2000

[54] MAGNETIC SEPARATION

[75] Inventors: James Henry Peter Watson, Bassett; Zhengnan Li, Highfield, both of United Kingdom

[73] Assignee: University of Southampton, Southampton, United Kingdom

[21] Appl. No.: 09/011,741

[22] PCT Filed: Feb. 23, 1996

[86] PCT No.: PCT/GB96/02067

§ 371 Date: Feb. 23, 1998

§ 102(e) Date: Feb. 23, 1998

[87] PCT Pub. No.: WO97/07895

PCT Pub. Date: Mar. 6, 1997

[30] Foreign Application Priority Data

Aug. 23, 1995 [GB] United Kingdom .................. 9517270

[51] Int. Cl.[7] ................................................ B01D 35/06

[52] U.S. Cl. ................................................ 210/695; 96/1

[58] Field of Search ................................ 210/695, 222; 95/27, 28; 96/1

[56] References Cited

U.S. PATENT DOCUMENTS

| | | | |
|---|---|---|---|
| 3,627,678 | 12/1971 | Marston et al. | 210/695 |
| 4,251,372 | 2/1981 | Dolle | 210/222 |
| 5,356,015 | 10/1994 | Notebaart et al. | 209/214 |

FOREIGN PATENT DOCUMENTS

| | | |
|---|---|---|
| 247 986 | 1/1911 | Germany . |
| 54 147577 | 1/1980 | Japan . |
| 57 144015 | 12/1982 | Japan . |
| 2000698 | 6/1978 | United Kingdom . |
| 2157195 | 10/1985 | United Kingdom . |
| 2163676 | 3/1986 | United Kingdom . |
| 2255031 | 10/1992 | United Kingdom . |
| 2 257 060 | 1/1993 | United Kingdom . |

OTHER PUBLICATIONS

J.H.P. Watson et al.; IEEE Transactions on Magnetics, "Vortex Magnetic Separation", pp. 4662–4664, Nov. 1994.

Svoboda, J.; "VMS: An Illusion or Reality?", Minerals Engineering, vol. 8, No. 6, pp. 571–575, 1995.

Watson, et al.; "Theoretical and Single–wire Studies of Vortex Magnetic Separation", Minerals Engineering, vol. 5, Nos. 10–12, pp. 1147–1165, 1992.

Watson, et al.; "The Effect of the Matrix Shape on Vortex Magnetic Separation", Minerals Engineering, vol. 8, No. 4–5, pp. 401–407, 1995.

Watson and Li, "A Study of Mechanical Entrapment in HGMS and vibration HGMS", Minerals Engineering 4 Nos. 7–11: pp. 815–823, 1991.

J.H.P. Watson et al.; IEEE Transactions on Magnetics, Vortex Capture in High Gradient Magnetic Separators at Moderate Reynolds Number ; Sep. 1989; pp. 3803–3805.

J.H.P. Watson, "Superconducting Magnetic Separation at Moderate Reynolds Number", Sep. 1979, pp. 1–7.

*Primary Examiner*—W. L. Walker
*Assistant Examiner*—Terry K.. Cecil
*Attorney, Agent, or Firm*—Renner, Otto, Boisselle & Sklar, L.L.P.

[57] ABSTRACT

A method for high grade magnetic separation using a matrix having one or more magnetizable matrix elements, wherein each element comprises a pair of poles aligned substantially parallel to a direction of flow of a slurry fluid containing particles to be separated, whereby a rear fluid vortex attributable to the upstream pole extends substantially to meet a front fluid vortex attributable to the downstream pole.

4 Claims, 2 Drawing Sheets

MAGNETIC SEPARATION

This invention relates to magnetic separation.

There currently exist a plurality of methods for the magnetic separation of various different articles. However, these methods all suffer from common disadvantages that limit their industrial utility.

High gradient magnetic separation is one of these processes in which magnetisable particles are extracted onto the surface of a fine ferromagnetic wire matrix which is magnetised by an externally applied magnetic field. The process, which is used to improve kaolin clay, was developed for and in conjunction with the kaolin industry in the United States of America. This process allows weakly magnetic particles of colloidal size to be manipulated on a large scale at high processing rates.

In addition to the clay industry, there are a large number of potential applications in fields as diverse as the cleaning of human bone marrow, nuclear fuel reprocessing, sewage and waste water treatment, industrial effluent treatment, industrial and mineral processing and extractive metallurgy.

Generally, these processes adopt one of a number of ways in which magnetic separation can be achieved, namely, (1) Where the difference in magnetic properties between the particles to be separated is sufficiently large to enable the separation of strongly magnetic particles from weakly or non-magnetic particles;

(2) Where the material, although not sufficiently magnetic, can be attached to something which is sufficiently magnetic for separation to be achieved, or (3) Where magnetic ions to be separated are in solution, a chemical or a biochemical treatment may be utilised to produce a magnetic precipitate which can either be extracted itself or attached to a magnetic particle.

Generally, in prior art methods of magnetic separation, electromagnets in conjunction with an iron circuit have been used to generate a magnetic field in the gap between the poles. Field gradients within the gap may be produced by shaping the poles or by using secondary poles.

Secondary poles consist of pieces of shaped ferromagnetic material which have been introduced into the gap. The magnetic induction produced in the gap in an iron circuit is limited to about 2 Tesla if the separation zone is reasonably large compared to the volume of the iron in the magnetic circuit.

The magnetisable particles processed by these prior art machines are separated by being deflected by the magnetic field configuration or they are captured and held by the secondary poles. The particles are released from the secondary poles by either switching off the magnetic field or by removing the secondary poles from the field mechanically. With particles which are large or strongly magnetic, separation can be accomplished with electromagnets which consume modest amounts of electric power.

Magnetic separation is achieved by a combination of a magnetic field and a field gradient which generates a force on magnetisable particles such that paramagnetic and ferromagnetic particles move towards the higher magnetic field regions and diamagnetic field particles move towards the lower field regions. The force $F_m$ on a particle is given in equation (1), below:

$$F_m = \chi V_p \frac{(B_0 \nabla B_0)}{\mu_0} \tag{1}$$

where $\chi$ is the magnetic susceptibility of a particle with volume $V_p$, $B_0$ is the applied magnetic field, $\nabla B_0$ is the magnetic field gradient, and $\mu_0$ is the constant $4\pi.10^{-7}$ h/m.

High gradient magnetic separation (HGMS) suffers from a number of disadvantages and problems when used for industrial purposes. For example, when a high particle recovery rate is required, a loss of recovered particle grade and mechanical entrainment of unwanted particles on the matrix may be observed. Furthermore, if the velocity of the slurry flow is increased to optimise the process, so the quantity of material trapped decreases. Furthermore, as the fluid velocity is increased the duty factor, ie the quantity of time for which the matrix is operable before it has to be cleaned, is dramatically reduced.

Finally, the parameter under which selection takes place in HGMS is $\chi b^2$ where $\chi$ is the magnetic susceptibility and b is the particle radius. HGMS is not selective for $\chi$ and this problem becomes worse as the particle size decreases and capture is dominated by size rather than $\chi$.

A relatively new technique entitled Vortex Magnetic Separation (VMS) solves some of these problems. Watson and Li, in an article entitled "A study of mechanical entrapment in HGMS and vibration HGMS"—*Minerals Engineering* 4 Nos. 7–11 (1991): pp. 815–823, have shown that mechanical entrainment can, for all practical purposes, be eliminated by VMS where capture of the magnetic material occurs on the downstream side of the wire. For single wires of circular cross section, this occurs for Reynolds numbers (Re) greater than about 6 but less than about 40 where the vortices become unstable. A similar downstream capture technique is disclosed in IEEE Transactions on Magnetics, Vol. 25, No. 5, Sept. 1, 1989.

In VMS particles are first attracted to the upstream side of a wire positioned in the gap but, under the conditions used (flow, velocity, field etc.), they are swept around in a boundary layer. If the centre of mass of the particle moves more than about 0.3 radii of the boundary layer thickness from the wire they reenter the main fluid flow and are not captured. If they stay within 0.3 of the boundary layer thickness they enter the vortex region where, if they are magnetic enough, they are captured. Particles which are not magnetic enough diffuse from the vortex system and reenter the main flow. This ability to reject oversize particles is an important advantage of VMS.

A brief discussion of the relevance of the Reynolds Number is appropriate. When a fluid flows around a blunt body such as a circular wire, the flow pattern depends upon the Reynolds number. The Reynolds Number is the ratio of inertia force to viscous force and is given by:

$$Re = 2\rho V_0 \frac{a}{\eta} \tag{2}$$

where $\rho$ is the density of the fluid, $\eta$ is the viscosity of the fluid, 2a is the diameter of the wire, and $V_0$ is the velocity of the fluid.

At a small Reynolds number, the boundary layer is actually formed due to frictional force on the immediate neighbourhood of the wire wall while the flow passes it and no boundary layer separation takes place. At increased Reynolds numbers, the adverse pressure gradient behind the wire causes the boundary layer to separate from the wire at a certain point. Two symmetrical eddies, each rotating in opposite directions, are formed. These eddies remain fixed to the rear of the wire and the main flow closes in behind them. Particles below a certain size entering the boundary layer may become trapped in these eddies and thus magnetically attracted to the wire or matrix. The length of this vortex material build-up region behind a wire or matrix is a result of the competition between the magnetic force and the shearing force of the returning flow in the vicinity of the rear of the wire.

Generally, the deciding factor regarding whether or not particle capture will occur is given by the ratio $V_m/V_0$, where $V_0$ is the slurry velocity and $V_m$ s the magnetic velocity—as defined by Watson above. Experimental results have shown that if $V_m/V_0>1$, then particles will become trapped on the front of the wire or matrix. The prior art methods generally exhibit such a method. Obviously, such a method is undesirable as particles may become easily dislodged from the wire or matrix by other particles and mechanical entrainment of non-magnetic particles can occur. If $V_m/V_0<1$, magnetic particles will first be concentrated on the front of the wire or matrix but cannot be held there, and then will follow the boundary layer flow to enter the wake region and become captured on the rear side of the wire.

As mentioned above, Watson and Li have shown that if particles are too large when compared with the boundary layer thickness, they do not enter the vortex flow region and are thus not retained by the matrix. The process (VMS) is further advantaged over the prior art as it works at high flow rate and therefore VMS is a high production rate process. This high production rate is aided by the fact that the volume of material captured on the downstream side increases with Re in the region 5 to 33. Finally, Particles with Vm/Vo>1 are rejected.

Watson and Li have found that VMS occurs over different ranges of Re depending on the shape of the secondary poles but at Re>approximately 40 the standing vortices become unstable and the effectiveness of VMS is reduced.

VMS has been implemented by Notebaart and Van der Meer using grids, in for example British Patent Application No. 9111228.4. However, if a wide range of particle size is used Vm/Vo>1 and upstream capture cannot be avoided which leads to mechanical entrainment and a consequent loss of grade. Furthermore, VMS only occurs on the downstream side of the mesh, thus limiting the storage capacity of the mesh. The process becomes unstable for Re>33.

This invention provides magnetic separation apparatus comprising one or more magnetisable elements disposed in a flow path of a fluid containing magnetisable particles to be separated from the fluid, each element having a pair of magnetisable poles substantially aligned with the direction of fluid flow and spaced apart along the direction of fluid flow such that a rear fluid vortex attributable to the upstream pole extends substantially to meet a front fluid vortex attributable to the downstream pole.

This invention also provides a method of magnetic separation of magnetisable particles contained in a fluid, the method comprising the steps of:

magnetising one or more magnetisable elements disposed in a flow path of the fluid, each element having a pair of magnetisable poles substantially aligned with the direction of fluid flow and spaced apart along the direction of fluid flow such that a rear fluid vortex attributable to the upstream pole extends substantially to meet a front fluid vortex attributable to the downstream pole.

This invention also provides a magnetic element for use in magnetic separation of magnetisable particles contained in a fluid, the element being disposable in a flow path of the fluid in substantial alignment with the direction of fluid flow, the element comprising:

a pair of magnetisable poles substantially aligned, in use, with the direction of fluid flow and spaced apart along the direction of fluid flow such that a rear fluid vortex attributable to the upstream pole extends substantially to meet a front fluid vortex attributable to the downstream pole.

Preferably the poles of each element are spaced apart along the direction of fluid flow such that the rear fluid vortex attributable to the upstream pole links to the front fluid vortex attributable to the downstream pole to form a single vortex region.

Further respective aspects of the invention are defined in the appended independent claims, along with further respective preferred features in the dependent claims. All of the preferred features defined in the claims are applicable to all of the various aspects of the invention.

This invention therefore provides a matrix design which can alleviate these problems and provide other advantages. The method has been generally named Trapped Vortex Magnetic Separation (TVMS).

In one exemplary embodiment, the matrix comprises a pair of poles arranged substantially in parallel to the direction of slurry flow. The poles are preferably spaced apart so that front and rear vortices attributable to pairs of the poles link up to provide a single vortex of increased stability.

In another embodiment, the matrix comprises a plurality of pole rows, each row being comprised of a plurality of poles aligned in parallel with said direction of slurry flow.

Preferably, the poles have a circular cross-section. However, numerous other configurations will be apparent to the man skilled in the art. For example, the pole may have a triangular, rectangular or square cross section. The poles may comprise rows of cylinders, ribbon discs, arrays of spheres, grids, meshes, colanders, perforated sheets or any other article having a body interspaced with a plurality of apertures.

The poles are preferably spaced from each other by a distance of approximately 1 pole diameter in the direction of fluid flow, and successive rows are spaced by a distance of approximately 1.5 pole diameters in a direction perpendicular to the direction of fluid flow.

In one embodiment, the poles each have a diameter of approximately 3 mm and thus, measuring from one pole centre to another, the poles are spaced a distance of 6 mm apart in a direction parallel to the direction of fluid flow, and a distance of 7.5 mm apart in a direction perpendicular to the direction of fluid flow.

In a preferred embodiment, a plurality of individual matrices are placed in communication with said slurry fluid, such that each row of each matrix lies parallel to said direction of slurry flow.

Preferably, successive matrices are offset from immediately preceding and/or immediately following matrices.

In one preferred embodiment, the offset distance may be approximately 1.25 diameters or approximately 3.75 millimeters measured from pole centre to pole centre.

This invention also provides a method of separating materials comprising providing at least one magnetisable matrix in a slurry flow and in parallel with the direction of said slurry flow, and magnetising said matrix by way of magnetic source means. Once again, in this embodiment, the poles are preferably spaced apart so that front and rear vortices attributable to pairs of the poles link up to provide a single vortex of increased stability.

In any of the embodiments discussed above, the magnetic means may be a superconducting magnet.

The present invention may be embodied in a plurality of different matrices. For example, rows of cylinders or ribbon discs may be arranged downstream of each other. Arrays of spheres may be arranged in the same way to trap vortices between them. Alternatively, grids or meshes may be provided in substantially perfect alignment downstream of each other with suitable separation to trap vortices.

If the flow is vertical, it is preferred to prevent gravity sedimentation onto the secondary poles by providing circular cross-section or spherical cross-section matrix elements. Although a number of shapes could fulfil this requirement. An alternative way to avoid the problem of gravity sedimentation is to have the field and flow in a horizontal direction.

In one embodiment, the secondary poles are arranged in many separated rows substantially exactly downstream of one another. These can be over various shapes. The separations between secondary poles cause standing vortices to appear between those poles for values of Re<1 and are stable for Re>100.

There are many advantages of at least preferred embodiments of this invention, such as:

(1) Capture on the upstream and downstream sides of the matrix with the alleviation of mechanical entrainment, (2) reduced matrix blockage, (3) rejection of oversized particles, and (4) the ability to capture particles with Vm/Vo>1 without causing increased mechanical entrainment.

In a preferred embodiment, in order to prevent channelling ie. loss of particles down the centre of a channel, after a certain number of secondary poles, the downstream registration of a following matrix is altered so that subsequent downstream secondary poles are placed substantially in the centres of the previous channels.

The invention will now be described, by way of example only, with reference to the accompanying drawings, in which like references refer to like parts and in which.

Figure 1:
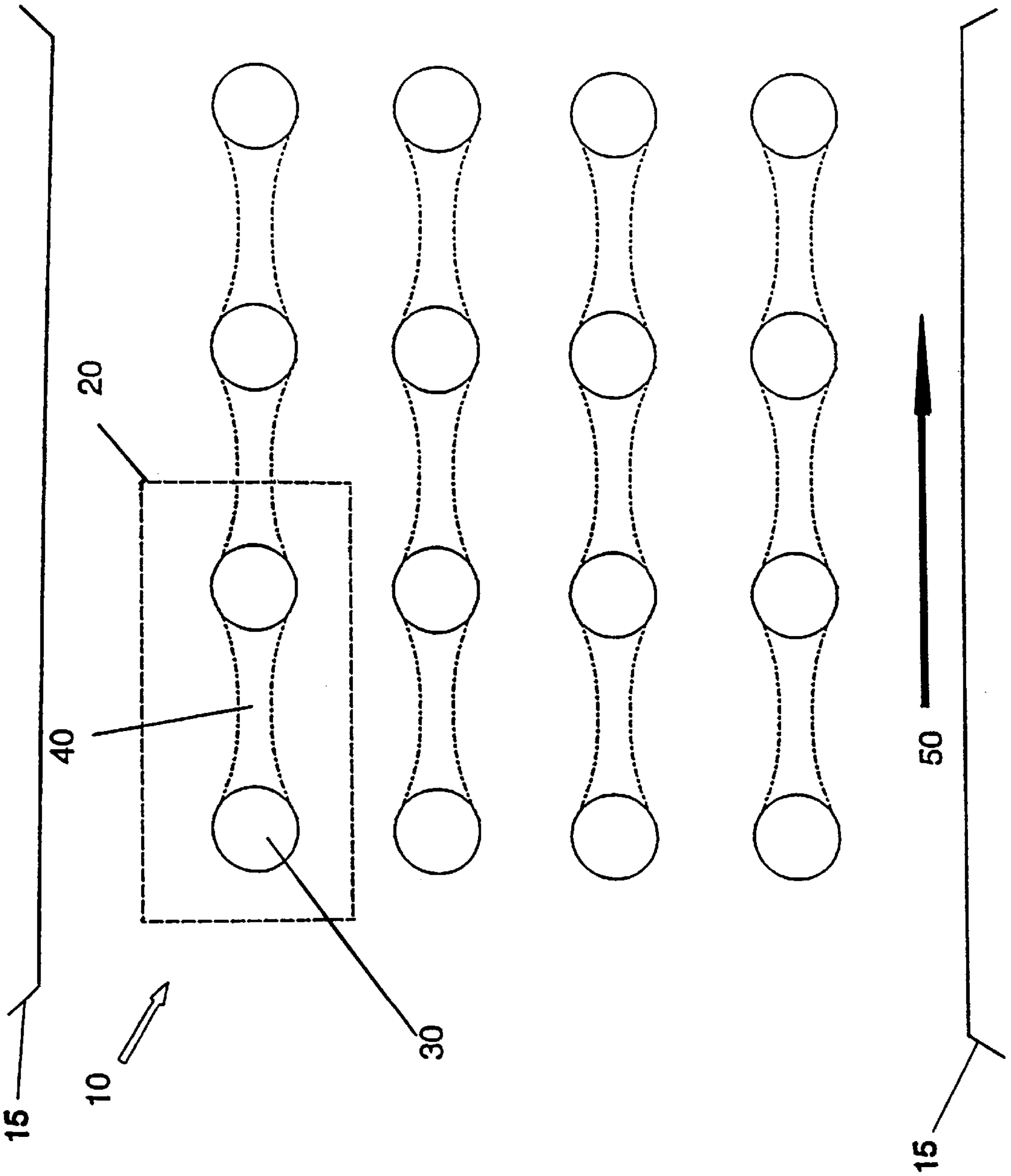
FIG. 1 is a schematic plan view of a plurality of matrix elements.

In FIG. 1, a matrix 10 comprising a plurality of individual matrix elements 20 is provided within an air-gap of a magnetic source 15 and in the path of a slurry flow. The matrix may be supported within, for example, a pipe (not shown) carrying the slurry or may be mounted within a canister (not shown) for splicing into such a pipe.

Each element 20 of the matrix 10 comprises a pair of secondary poles 30 (an upstream pole and a downstream pole) substantially aligned parallel to the direction 50 of slurry flow and induced magnetic field. A vortex region 40 is formed between the constituent poles 30 of each element 20 and between successive elements 20.

A rear vortex forms to the rear of the leading pole 20. Due to the geometry of the matrix arrangement 10, a similar vortex forms at the front of the second pole 30. These front and rear vortices join together to form a single large vortex 40 into which particles may be drawn and held. As shown, in fact the rear vortex from the downstream pole of the element 20 links up with the front vortex of the upstream pole of the next element. Thus, a series of linked vortices can be set up.

The skilled man will appreciate the use of the conventional definition of the boundary between a vortex region and a non-vortex region.

Figure 2:
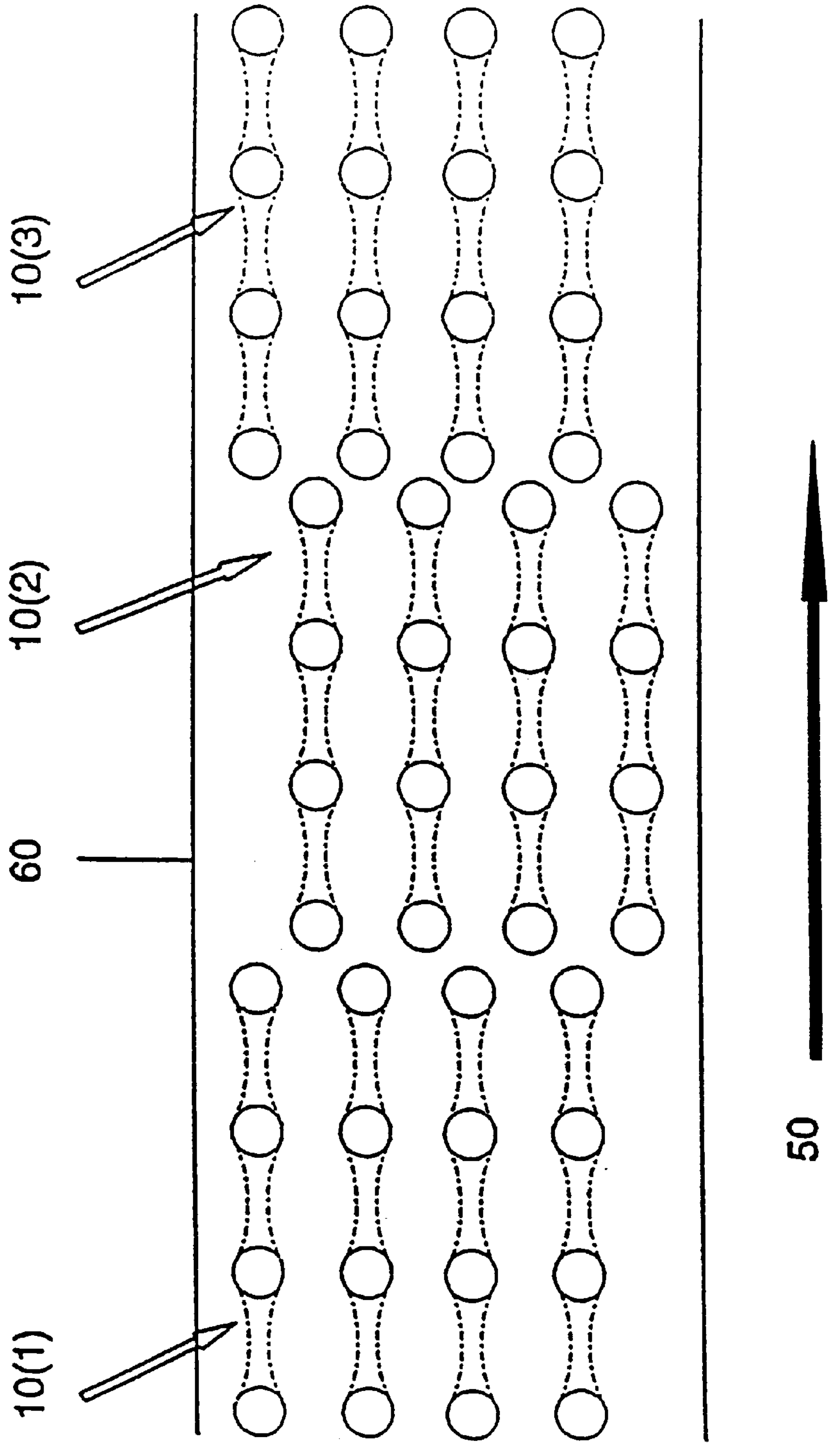
FIG. 2 is a schematic plan view of a second embodiment of a plurality of matrix elements.

FIG. 2 shows an alternative embodiment whereby successive matrices 10(1,2,3) have been provided within a slurry pipe 60. For clarity, the magnetic source is not shown, but it would be generally at least partially coaxial with the pipe, either inside or (more preferably to avoid contamination) outside the pipe. The matrices have each been offset from each the immediately preceding and following matrices. The distance of the offset is approximately equal to half of the distance between successive rows of secondary poles 30. In this way, it is assured that any particles that fail to be captured by a leading matrix 10(1) will probably come into contact with the following matrix 10(2). In this way, the operation may be greatly improved.

The spacing of the elements 20 should preferably be approximately constant throughout a matrix 10. However, the spacing of successive rows of poles 20 varies according to the slurry velocity field strength etc. Similarly, the spacing of the individual poles will also vary according to the environmental conditions under which the matrix is used. Having said this, one example of suitable spacings is given below.

Successive rows of the matrix need not be aligned such their respective front poles are aligned in a plane perpendicular to the direction of fluid flow. Successive rows could be aligned such that front poles thereof are offset with respect to neighbouring or other front poles.

The secondary poles 20 are manufactured from type 430 Stainless Steel with a saturation magnetisation of 1.7 Tesla. The applied magnetic field is between 0.5 and 5 Tesla. In this example, the matrix passes 425 micron particles without exhibiting any blocking of the channels between successive matrix rows. In the direction of fluid flow, the poles are preferably spaced a distance of 1 pole diameter apart and successive rows are spaced apart a distance of 1.5 pole diameters in a direction perpendicular to the direction of fluid flow. In this example, the poles each have a diameter of approximately 3 millimeters. Thus, measuring from the centre of one pole to the centre of another pole, the poles are spaced a distance of 6 millimeters apart in a direction parallel to the direction of fluid flow and spaced a distance of 7.5 millimeters apart in a direction perpendicular to the direction of fluid flow. In general, a range of spacings up to (for the circumstances of this embodiment) about 2 pole diameters may be used. However, other spacings can be established theoretically or empirically.

In order to maintain the Reynolds number within the boundaries discussed above, the system is set up so that Re is approximately 15 which in turn represents, from Equation 2, a fluid (slurry) velocity of approximately $5.10^{-3}$ m/s.

Various modifications may be made within the scope of the appended claims.

For example, the cross sectional shape of the individual poles 30 is not critical and many different configurations will be apparent. Similarly, the number of matrices or the number of poles in a matrix may be varied.

Many different configurations may be adopted for the matrices. They may be shaped like colanders, grids, perforated sheets, or any other article having a body interspaced with a plurality of apertures.

Embodiments of the invention therefore provide a number of advantages:

(1) A process which can reduce mechanical entrainment towards a negligible value;

(2) A process works at relatively high velocity compared with conventional HGMS and so has potentially higher throughput;

(3) A process which can reject oversize particles;

(4) A process which can capture particles on both the upstream and downstream sides of the wire;

(5) A process which will work over a very wide range of Reynolds numbers and magnetic field strengths; and (6) Apparatus which is potentially less prone to blocking than other previous matrices.

PUBLICATION REFERENCES

1. J. Svoboda. De Beers Diamond Research Laboratory, "VMS: An Illusion or Reality?", *Minerals Engineering,* Vol.8, No. 4/5, pp. 571–575 (1995).
2. J. H. P. Watson and Z.Li. "Vortex Magnetic Separation", *IEEE Transactions on Magnetics,* Vol.30, No.6 November 1994, pp.4662–4664.
3. United Kingdom Patent Application No. 9111228.4, Published as GB 2257060.
4. J. H. P. Watson, "Superconducting Magnetic Separation at Moderate Reynolds Number", *XV International Congress Of Refrigeration,* Venice 23–29 September 1979.
4. J. H. P. Watson and Z.Li, "The Effect of the Matrix Shape on Vortex Magnetic Separation", *Minerals Engineering, Vol* 8, No. 4/5, pp.401–407, 1995.
5. J. H. P. Watson and Z.Li, "Theoretical and Single-Wire Studies of Vortex Magnetic Separation", *Minerals Engineering,* Vol.5, Nos 10–12, pp. 1147–1165, 1992.
6. J. H. P. Watson and Z.Li, "The Experimental Study with a Vortex Magnetic Separation (VMS) Device" present at *Minerals Engineering* '95, Tregenna Castle, St. Ives, United Kingdom, Jun. 14–16, 1995. This paper was unpublished in documentary form at the priority date of this patent application, and so a copy of the paper is attached to the application papers of this International application, to be retained on the file by the International Authorities.

We claim:

1. A method of magnetic separation of magnetisable particles contained in a fluid, the method comprising the steps of:

magnetising one or more magnetisable elements disposed in a flow path of the fluid, each element having a pair of magnetisable poles substantially aligned with the direction of fluid flow and spaced apart along the direction of fluid flow such that a rear fluid vortex attributable to the upstream pole extends substantially to meet a front fluid vortex attributable to the downstream pole.

2. A method of separating materials, the method comprising providing at least one magnetisable matrix including one or more matrix elements, each matrix element including a pair of poles; aligning the poles substantially parallel with the direction of a slurry fluid flow containing material to be separated; and magnetizing the matrix by way of magnetic source, wherein the poles are spaced apart so that front and rear vortices attributable said pair of poles link up to provide a single vortex of increased stability.

3. A method according to claim 2, wherein the magnetic source is a superconducting magnet.

4. A method according to claim 2, wherein after a predetermined number of poles, downstream registration of a following matrix is altered so that subsequent downstream poles are placed substantially in the centres of previous channel.

* * * * *

UNITED STATES PATENT AND TRADEMARK OFFICE

CERTIFICATE OF CORRECTION

PATENT NO. : 6,045,705

DATED : April 4, 2000

INVENTOR(S) : James Henry Peter Watson and Zhengnan Li

It is certified that error appears in the above-indentified patent and that said Letters Patent is hereby corrected as shown below:

On title page, item [22] PCT Filed:

replace "Feb. 23, 1996" with --Aug. 23, 1996--.

Signed and Sealed this

Sixth Day of March, 2001

*Attest:*

Nicholas P. Godici

NICHOLAS P. GODICI

*Attesting Officer*

*Acting Director of the United States Patent and Trademark Office*